(12) United States Patent
Hiramatsu

(10) Patent No.: US 7,365,472 B2
(45) Date of Patent: Apr. 29, 2008

(54) ELECTRIC GENERATOR

(76) Inventor: Keiji Hiramatsu, 3-16, Hirai 5-chome, Kusatsu-shi, Shiga 525-0023 (JP)

( * ) Notice: Subject to any disclaimer, the term of this patent is extended or adjusted under 35 U.S.C. 154(b) by 0 days.

(21) Appl. No.: 11/471,951

(22) Filed: Jun. 21, 2006

(65) Prior Publication Data

US 2007/0069600 A1 Mar. 29, 2007

Related U.S. Application Data

(62) Division of application No. 10/499,800, filed on Jun. 22, 2004, now Pat. No. 7,088,029.

(51) Int. Cl.
*H02K 1/06* (2006.01)
*H02K 1/22* (2006.01)
*H02K 3/00* (2006.01)
(52) U.S. Cl. .................. 310/263; 310/184; 310/185
(58) Field of Classification Search ................ 310/216, 310/263, 268, 254, 257, 261, 49 R, 184, 310/185
See application file for complete search history.

(56) References Cited

U.S. PATENT DOCUMENTS

| | | | | |
|---|---|---|---|---|
| 2,070,447 A | * | 2/1937 | Morrill | 310/164 |
| 3,790,834 A | * | 2/1974 | Tanaka | 310/162 |
| 4,677,328 A | * | 6/1987 | Kumakura | 310/67 R |
| 4,775,813 A | * | 10/1988 | Janson | 310/257 |
| 5,606,207 A | * | 2/1997 | Gotoh | 310/67 A |
| 5,828,145 A | * | 10/1998 | Nakamura | 310/67 A |
| 5,982,070 A | * | 11/1999 | Caamano | 310/216 |
| 6,509,666 B1 | * | 1/2003 | Huang et al. | 310/254 |
| 6,756,719 B1 | * | 6/2004 | Chiu | 310/257 |
| 6,891,289 B2 | * | 5/2005 | Barrho et al. | 310/49 R |

FOREIGN PATENT DOCUMENTS

| | | |
|---|---|---|
| JP | 1-171583 | 12/1969 |
| JP | 57-186178 | 11/1982 |
| JP | 61-185271 | 11/1986 |
| JP | 62-152668 | 9/1987 |
| JP | 9-286365 | 11/1997 |
| JP | 2004-096868 A | 3/2004 |

* cited by examiner

*Primary Examiner*—Tran Nguyen
(74) *Attorney, Agent, or Firm*—Milde & Hoffberg, LLP

(57) ABSTRACT

An electric generator 10 of the present invention comprises a permanent magnet 14, a coil 30, a yoke 20, and attracted means 19 composed of a plurality of attracted pieces 18 which are arranged radially around the rotation axis 12 and are magnetized by the permanent magnet 14. The permanent magnet 14, the coil 30, the yoke 20, and the attracted means 19 are mounted on the rotation axis 12 and the attracted pieces 18 that constitute the attracted means 19 are each placed in positions that correspond to positions that bisect the spaces between the metal pieces that constitute the yoke 20, so that the cogging torque exerted the rotation axis 12 is reduced.

2 Claims, 11 Drawing Sheets

FIG. 8 (a)
FIG. 8 (b)
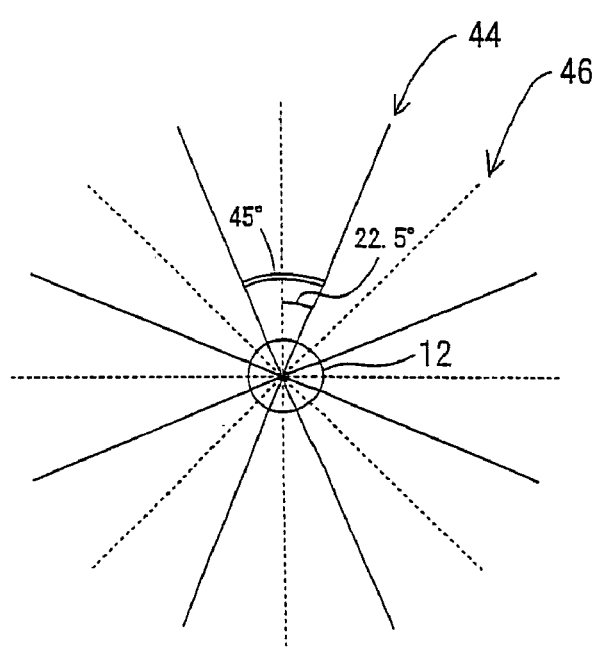
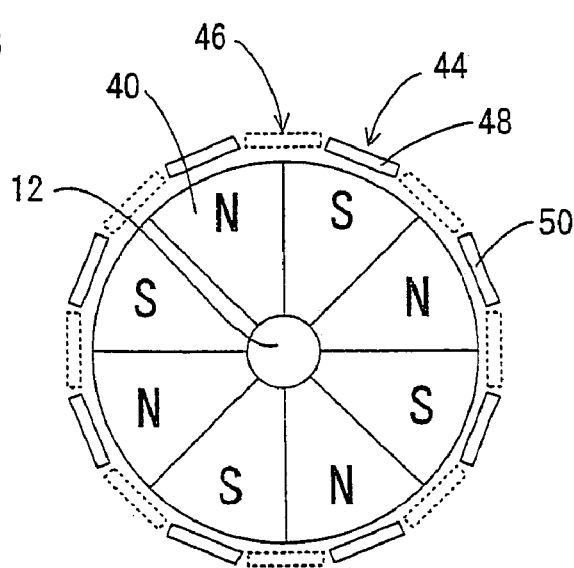

sectional view
taken on line A-A
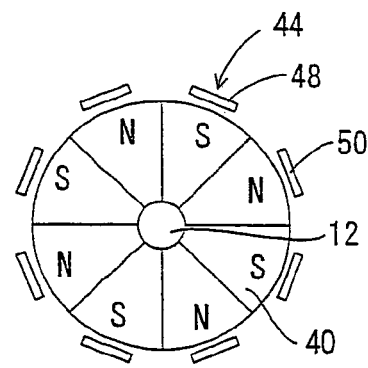
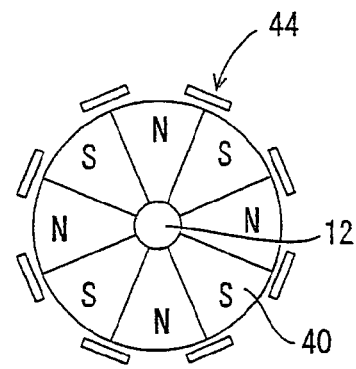
sectional view
taken on line B-B
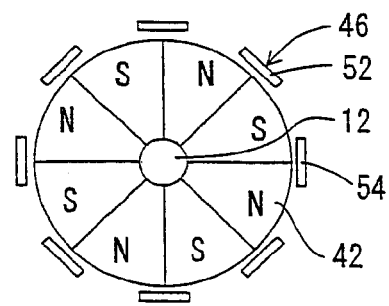
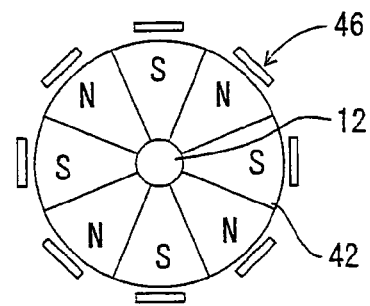
FIG. 9 (a)
FIG. 9 (b)
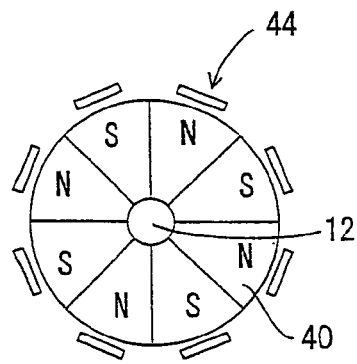
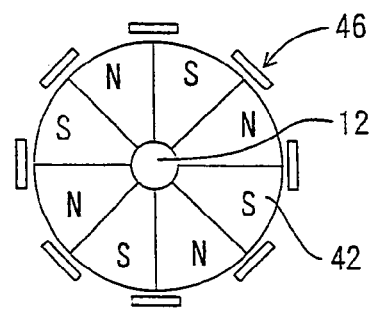
FIG. 9 (c)

ELECTRIC GENERATOR

CROSS-REFERENCE TO RELATED APPLICATION

This application is a divisional application of U.S. patent application Ser. No. 10/499,800, filed Jun. 22, 2004, now U.S. Pat. No. 7,088,029.

FIELD OF THE INVENTION

The present invention relates to an electric generator. More particularly, the invention relates to an electric generator that decreases effects exerted on a rotation axis by a so-called cogging torque that is generated when magnetic field supplying means attracts a yoke.

BACKGROUND OF THE INVENTION

Based on the principle of operation, electric generators are categorized into synchronous generators, induction generators, and direct current generators. In any of these generators, when a magnetic field is applied to the coil of wire, an electromotive force is generated in the coil.

As a small synchronous generator, a bicycle dynamo is generally well known. In the bicycle dynamo, when a permanent magnet with south poles and north poles alternately arranged is turned, iron pieces provided to the coil are magnetized and an electromotive force is generated in the coil.

Such iron pieces provided to the coil are close to the permanent magnet at a small distance so as to efficiently apply a magnetic field to the coil. If the permanent magnet with a strong magnetic force is used to apply a strong magnetic field to the coil, a strong attractive force of the permanent magnet to the iron pieces is generated between the iron pieces and the permanent magnet. The force that the attractive force exerts on a rotation axis is called cogging torque. If the cogging torque is strong, various problem such as running torque fluctuations, abnormal vibration, and noise arise. For example, in the case of a bicycle dynamo, a heavy load is applied to the wheel when the wheel is turned. In the case of a wind turbine generator or the like, if cogging torque is strong, starting torque of a rotor becomes strong. In addition, the resistance to continuous rotation of the rotor becomes high. For this reason, it is difficult to generate electricity in light wind conditions.

DISCLOSURE OF THE INVENTION

An electric generator of the present invention comprises: a permanent magnet composed of magnetic poles arranged radially and alternately around a rotation axis; a coil wound around an electrically insulated bobbin; a plurality of metal pieces that rotate relatively to the permanent magnet and that apply magnetic flux generated by the permanent magnet to the coil; and attracted means having a plurality of attracted pieces that are arranged radially around the rotation axis and that are magnetized by the permanent magnet, wherein the attracted pieces of the attracted means are placed in such positions that they do not correspond to the metal pieces.

Further, an electric generator of the present invention comprises: a permanent magnet composed of magnetic poles arranged radially and alternately around a rotation axis; a coil wound around an electrically insulated bobbin; a plurality of metal pieces that rotate relatively to the permanent magnet and that apply magnetic flux generated by the permanent magnet to the coil; and attracted means having a plurality of attracted pieces that are arranged radially around the rotation axis and that are magnetized by the permanent magnet, wherein the attracted pieces of the attracted means are placed in positions that correspond to positions that bisect spaces between the metal pieces.

Further, an electric generator of the present invention comprises: a permanent magnet composed of magnetic poles arranged radially and alternately around a rotation axis; and two wire wound means composed of a coil wound around an electrically insulated bobbin and a plurality of metal pieces that rotate relatively to the permanent magnet and that apply magnetic flux generated by the permanent magnet to the coil, wherein the metal pieces of one of the wire wound means are placed in such positions that they do not correspond to the metal pieces of the other wire wound means.

Further, an electric generator of the present invention comprises: a permanent magnet composed of magnetic poles arranged radially and alternately around a rotation axis; and two wire wound means composed of a coil wound around an electrically insulated bobbin and a plurality of metal pieces that rotate relatively to the permanent magnet and that apply magnetic flux generated by the permanent magnet to the coil, wherein the metal pieces of one of the wire wound means are placed in positions that correspond to positions that bisect spaces between the metal pieces of the other wire wound means.

Further, an electric generator of the present invention comprises a plurality of electric generating means having a permanent magnet composed of magnetic poles arranged radially and alternately around a rotation axis, a coil wound around an electrically insulated bobbin, and a plurality of metal pieces that rotate relatively to the permanent magnet and that apply magnetic flux generated by the permanent magnet to the coil, wherein the metal pieces of any one of the electric generating means are placed in such positions that they do not correspond to the metal pieces of the rest of the electric generating means.

Further, an electric generator of the present invention comprises a plurality of electric generating means having a permanent magnet composed of magnetic poles arranged radially and alternately around a rotation axis, a coil wound around an electrically insulated bobbin, and a plurality of metal pieces that rotate relatively to the permanent magnet and that apply magnetic flux generated by the permanent magnet to the coil, wherein the metal pieces of any one of the electric generating means are placed in positions that correspond to positions that bisect spaces between the respective metal pieces of the rest of the electric generating means.

Further, an electric generator of the present invention comprises a plurality of electric generating means having a permanent magnet composed of magnetic poles arranged radially and alternately around a rotation axis, a coil wound around an electrically insulated bobbin, and a plurality of metal pieces that rotate relatively to the permanent magnet and that apply magnetic flux generated by the permanent magnet to the coil, wherein the magnetic poles of any one of the electric generating means are placed in such positions that they do not correspond to the magnetic poles of the rest of the electric generating means.

Further, an electric generator of the present invention comprises a plurality of electric generating means having a permanent magnet composed of magnetic poles arranged radially and alternately around a rotation axis, a coil wound around an electrically insulated bobbin, and a plurality of metal pieces that rotate relatively to the permanent magnet and that apply magnetic flux generated by the permanent magnet to the coil, wherein the magnetic poles of any one of the electric generating means are placed in positions that correspond to positions that bisect spaces between the magnetic poles of the rest of the electric generating means.

Further, in the electric generator of the present invention, the aforementioned permanent magnet is a cylindrical-shaped permanent magnet composed of magnetic poles arranged radially and alternately around the rotation axis, and the aforementioned plurality of metal pieces and the aforementioned attracted pieces of the attracted means are close to the outer perimeter of the permanent magnet.

Further, in the electric generator of the present invention, the aforementioned permanent magnet is a cylindrical-shaped permanent magnet composed of magnetic poles arranged radially and alternately around the rotation axis, and the aforementioned plurality of metal pieces are close to the outer perimeter of the permanent magnet.

Further, in the electric generator of the present invention, the aforementioned permanent magnet is a ring-shaped permanent magnet composed of magnetic poles arranged radially and alternately around the rotation axis, and the aforementioned plurality of metal pieces and the aforementioned attracted pieces of the attracted means are close to the inside perimeter of the permanent magnet.

Further, in the electric generator of the present invention, the aforementioned permanent magnet is a ring-shaped permanent magnet composed of magnetic poles arranged radially and alternately around the rotation axis, and the aforementioned plurality of metal pieces are close to the inside perimeter of the permanent magnet.

BRIEF DESCRIPTION OF THE INVENTION

FIGS. 4(a) to 4(d) are sectional views showing a positional relationship between field iron piece, permanent magnet, and attracted pieces in the electric generator according to the first embodiment of the present invention, and schematically illustrate the changes in distances between a magnetic field of the permanent magnet, field iron pieces, and attracted pieces during the rotation of rotational axis.

Figure 5:
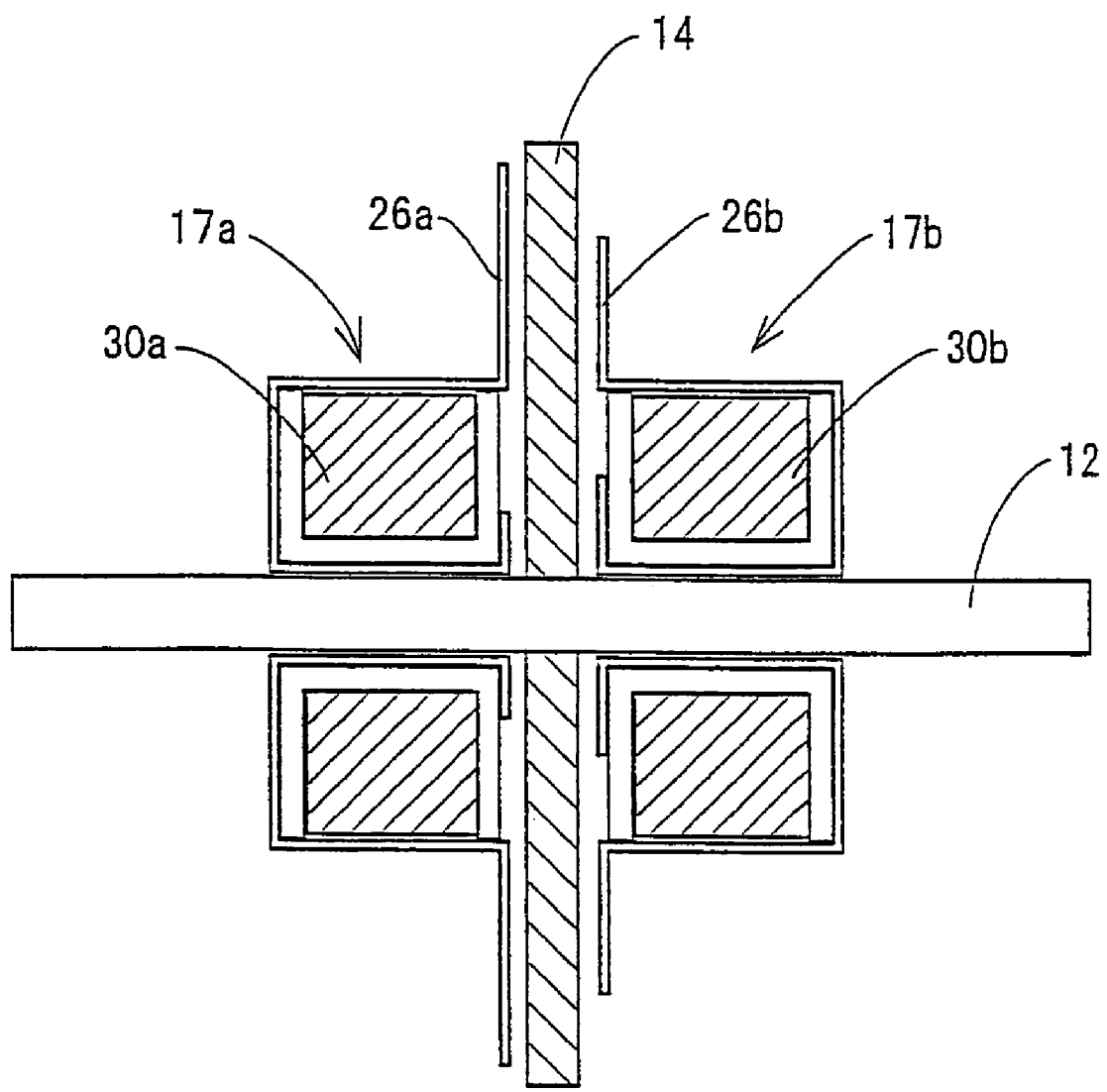

FIG. 5 is a cross-sectional schematic view of an electric generator according to a second embodiment of the present invention.

Figure 6:
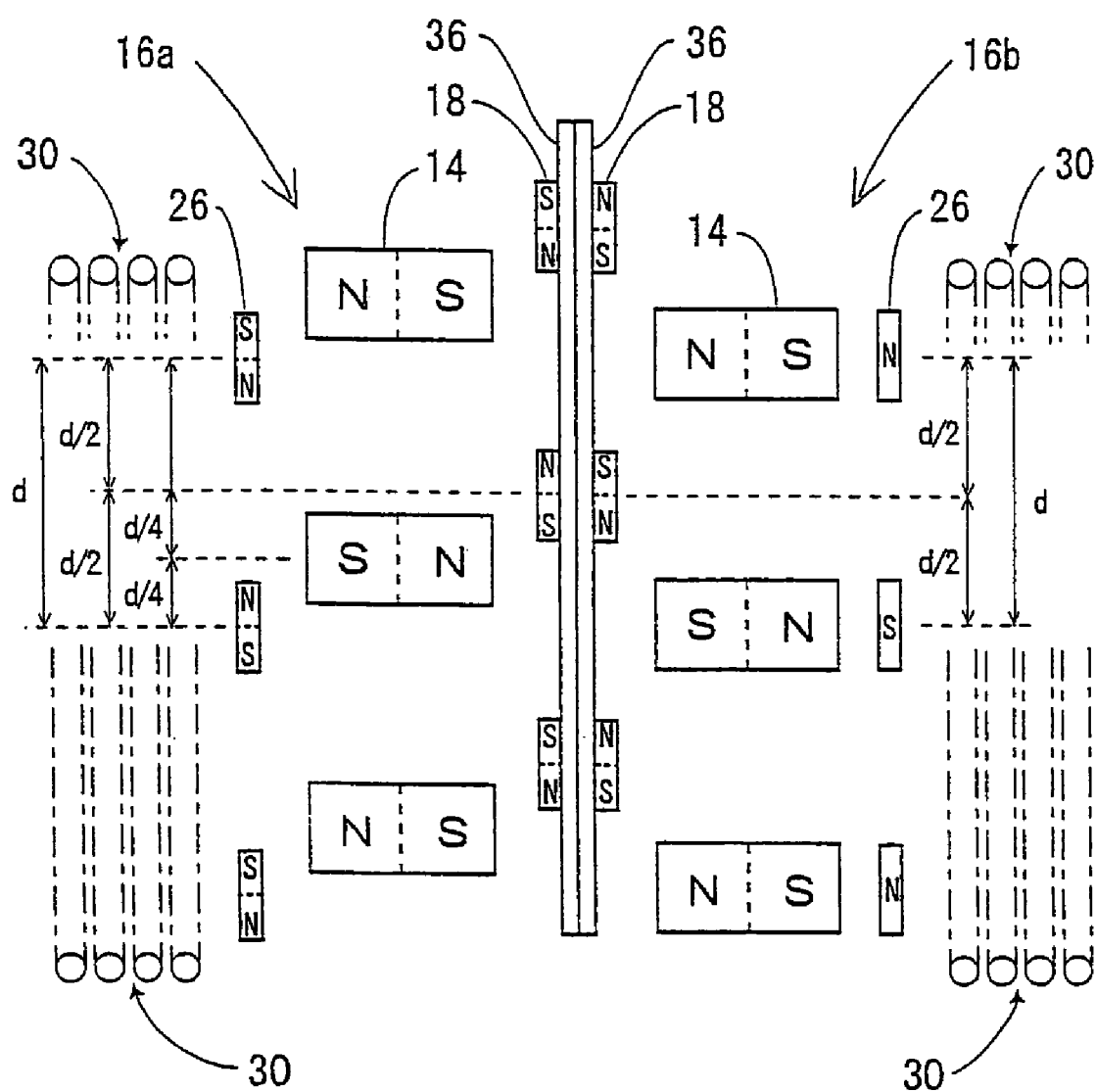

FIG. 6 is a cross-sectional schematic view of an electric generator according to a third embodiment of the present invention.

Figure 7:
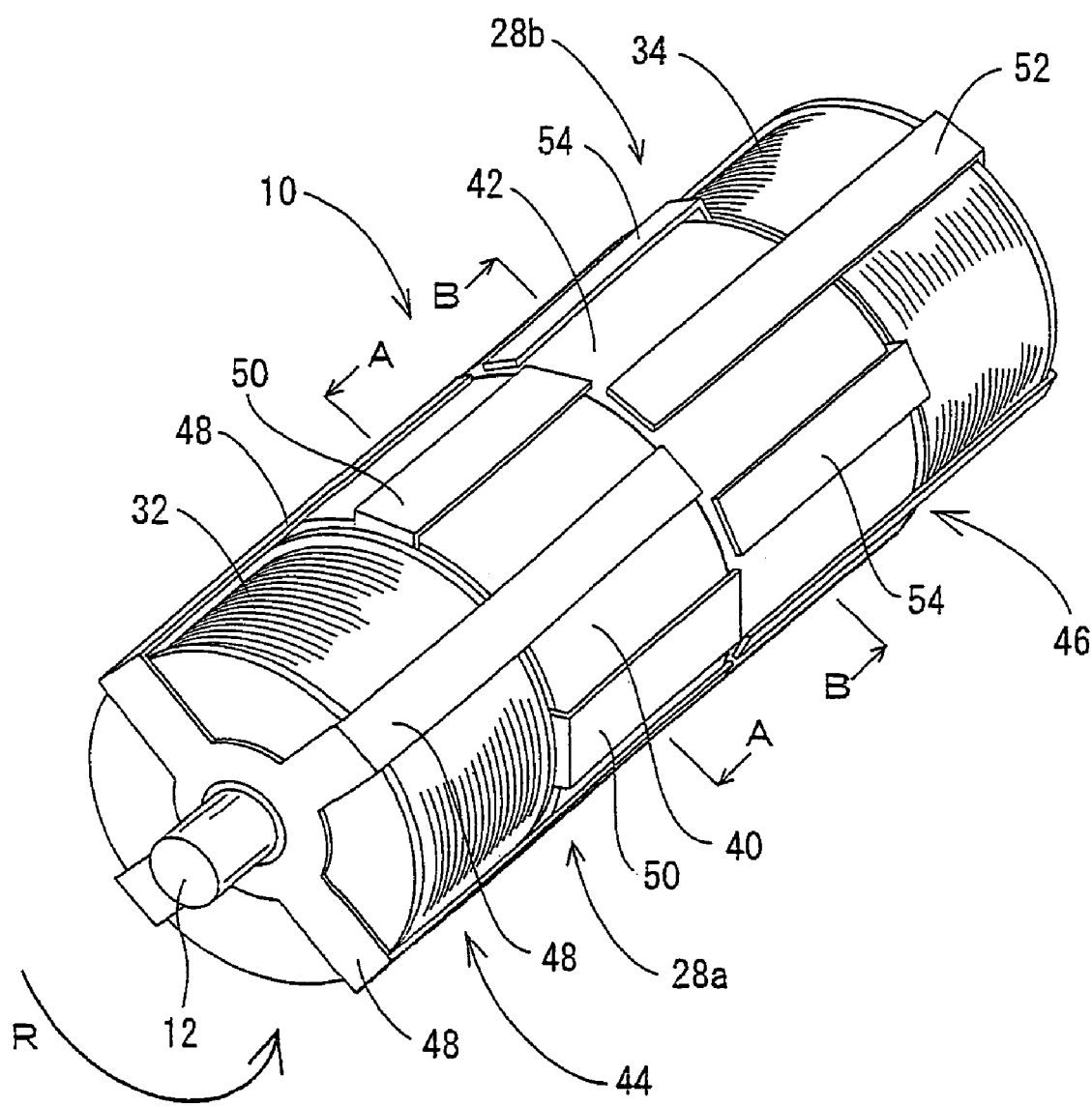

FIG. 7 is a perspective view of an electric generator according to a fourth embodiment of the present invention.

FIGS. 8(a) and 8(b) are sectional views showing a positional relationship between field iron pieces in the electric generator according to the fourth embodiment of the present invention.

FIGS. 9(a) to 9(c) are sectional views illustrating the changes of the positional relationship between field iron pieces and magnetic poles of the permanent magnet during the rotation of the rotational axis in the electric generator according to the fourth embodiment of the present invention.

In FIGS. 9(a) to 9(c), an upper view is a sectional view taken on line A-A of FIG. 7 and a lower view is a sectional view taken on line B-B of FIG. 7.

Figure 10:
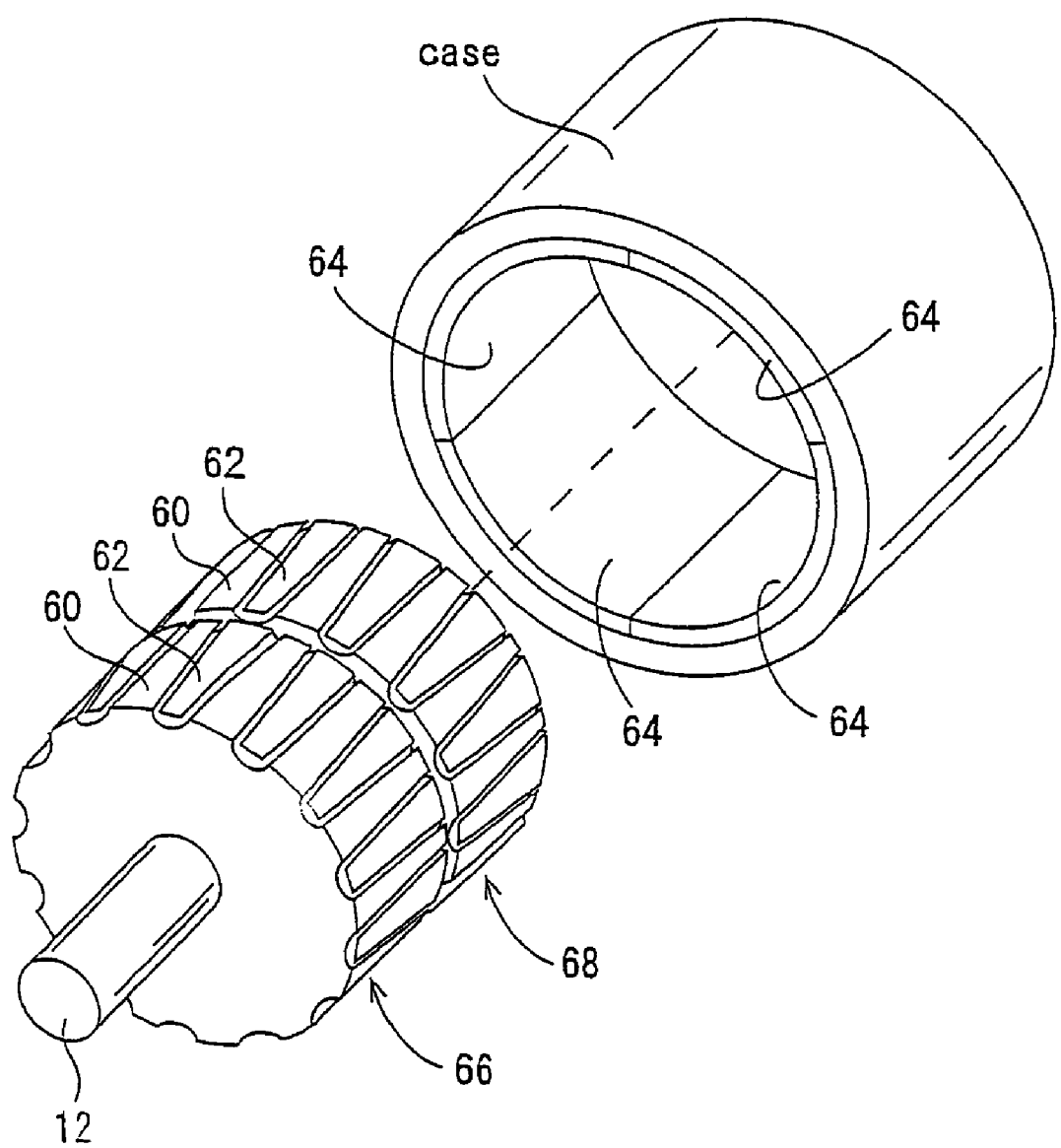

FIG. 10 is an exploded perspective view of the electric generator according to a fifth embodiment of the present invention.

Figure 11:
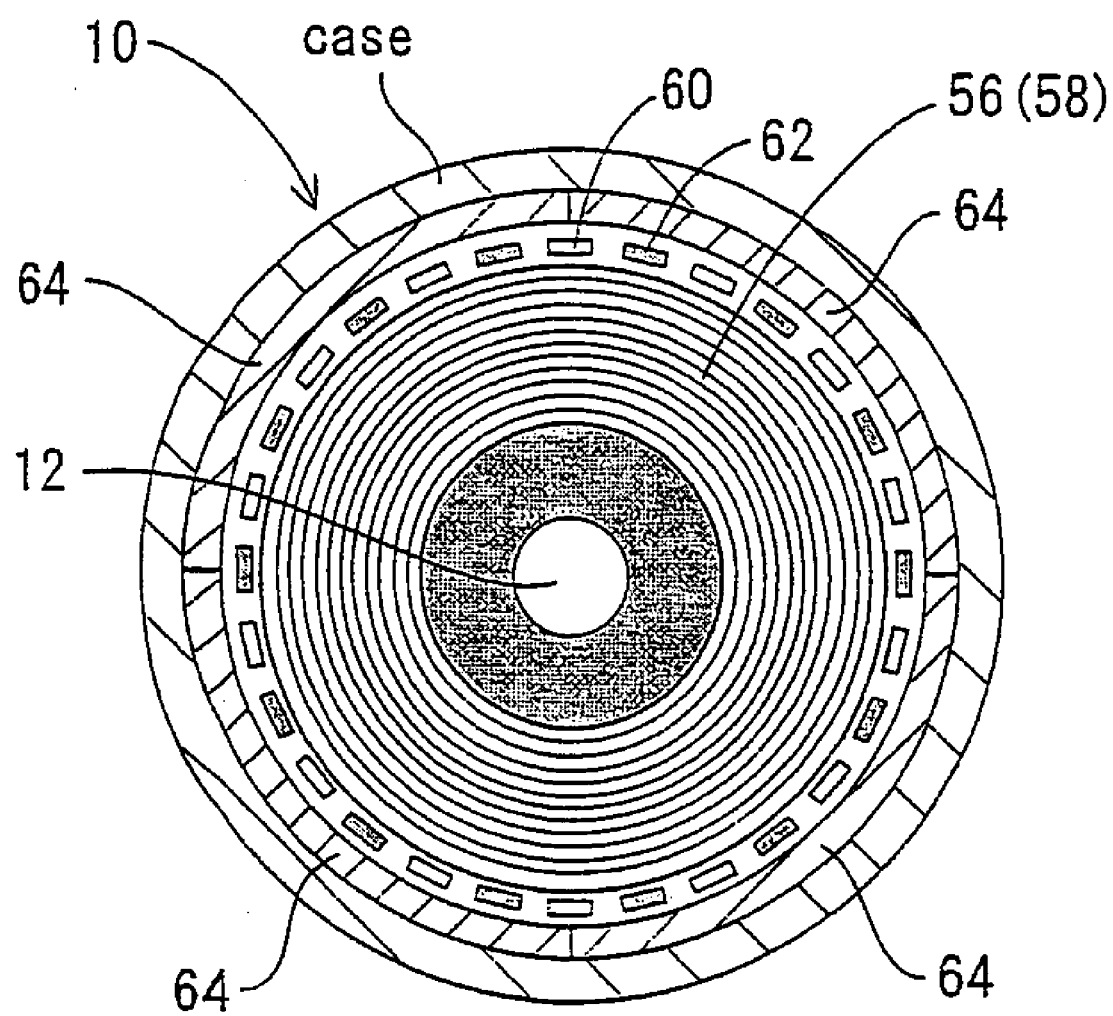

FIG. 11 is a sectional view of an electric generator according to the fifth embodiment of the present invention.

DESCRIPTION OF THE PREFERRED EMBODIMENTS

Figure 1:
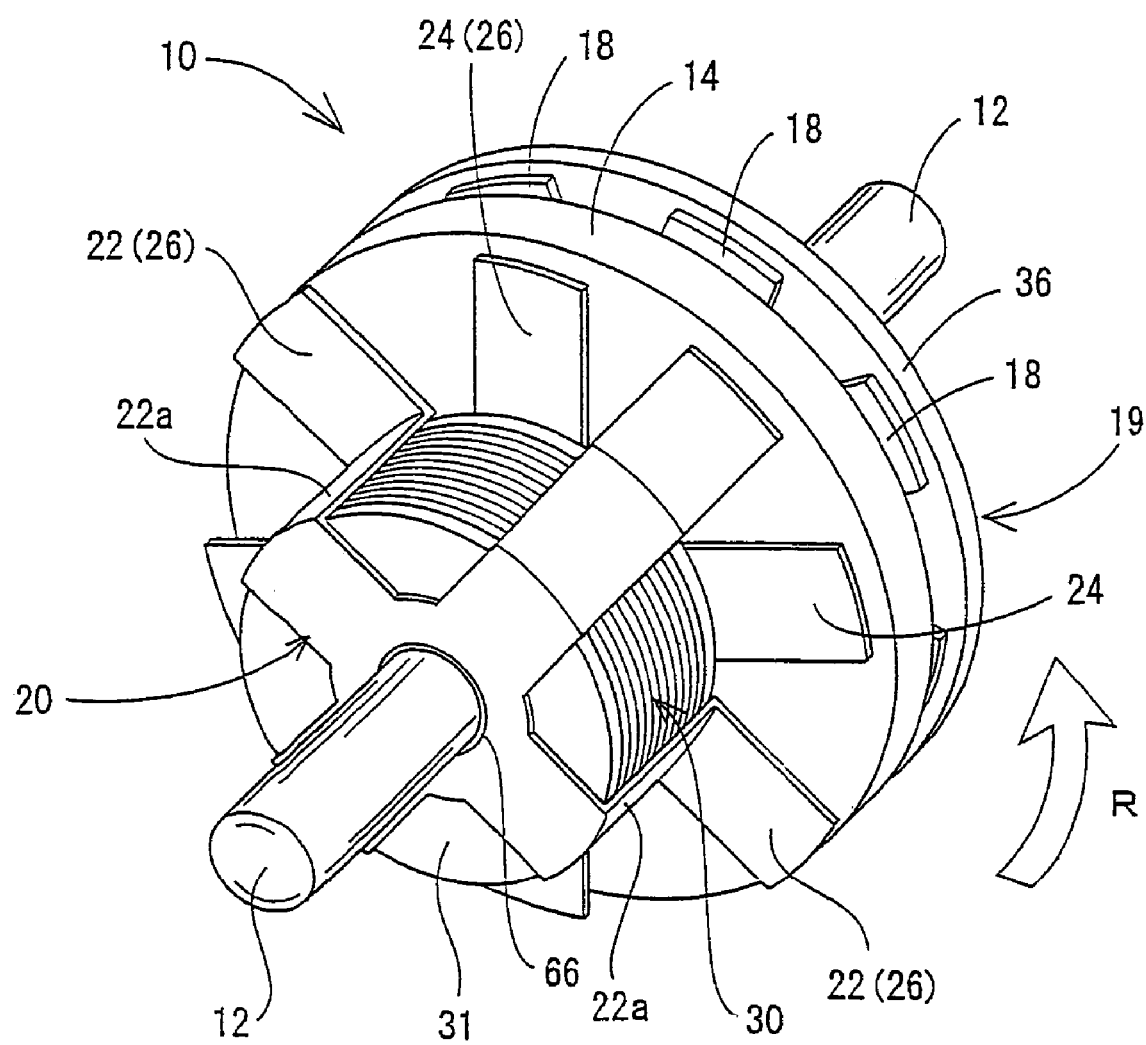
FIG. 1 is a perspective view of an electric generator according to a first embodiment of the present invention.
Figure 2:
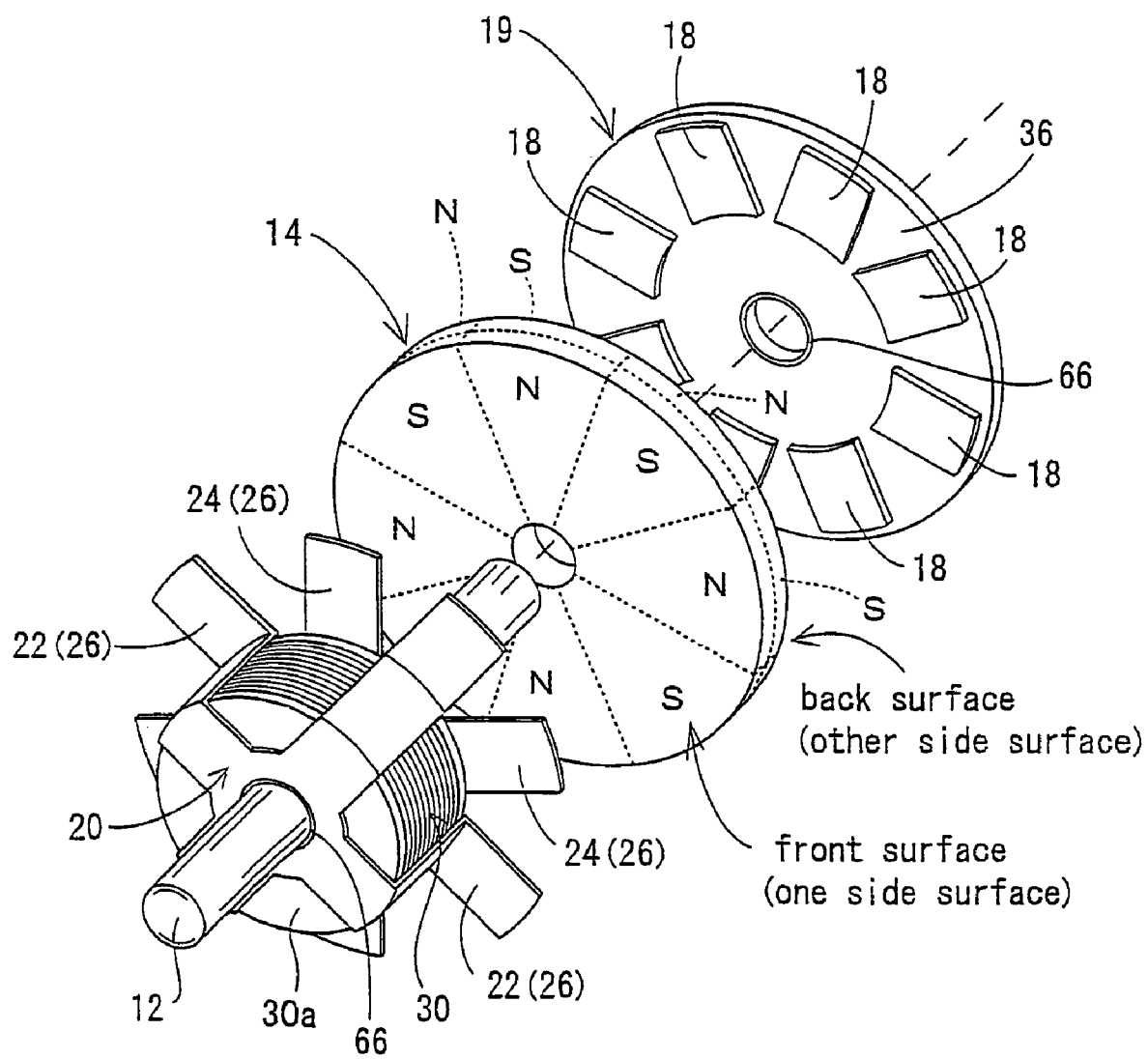
FIG. 2 is an exploded perspective view of an electric generator according to the first embodiment of the present invention.

A first embodiment of the present invention will be described with reference to the accompanying drawings. FIG. 1 is a perspective view of an electric generator 10 according to the first embodiment and FIG. 2 is an exploded perspective view of the electric generator 10. The electric generator 10 comprises: a permanent magnet 14 with magnetic poles arranged radially and alternately around a rotation axis 12 to which rotational power is transmitted from the outside; a coil 30 wound around an electrically insulated bobbin 31; a yoke 20 for applying magnetic flux generated by the permanent magnet 14 to the coil 30; and attracted means 19 having a plurality of attracted pieces 18 that are magnetized by the permanent magnet 14 and that are arranged radially around the rotation axis 12. In FIG. 1, an arrow R indicates a rotational direction of the rotation axis.

In this embodiment, the yoke 20, the coil 30, and the attracted means 19 are a stator, and the permanent magnet 14 is a rotator. However, the permanent magnet 14 may be used as a stator while the yoke 20, the coil 30, and the attracted means 19 may be used as a rotator.

First, the permanent magnet 14 will be described. As shown in FIG. 2, the permanent magnet 14 is shaped like a disk having a proper thickness and the center of the permanent magnet is fixed by the rotation axis 12. In this permanent magnet 14, 45 degree pie-shaped north poles and south poles are arranged alternately around the rotation axis 12. This disk-shaped permanent magnet 14 has opposite magnetic poles on its reverse side in the thickness direction.

In this permanent magnet 14, volumes and magnetic flux densities of the respective magnetic poles are equal. In this embodiment, the permanent magnet 14 is made of ferrite. In this permanent magnet 14, one of the side surface close to the yoke 20 is hereinafter referred to as "front surface" and the other side surface close to the attracted means 19 is referred to as "back surface".

While the disk-shaped permanent magnet 14 is used in this embodiment, the shape of the permanent magnet is not particularly limited as far as the magnetic poles are arranged radially around the rotation axis 12. For example, independent rectangular permanent magnets may be arranged radially around the rotation axis 12.

In the permanent magnet 14, the magnetic flux density is deemed to be the highest at the center of the surface of each magnetic pole. Therefore, when the position of the permanent magnet 14 will be described, the position of the center of the surface of the pole is used as a pitch reference. Also, when the positions of the field iron piece 26 and the attracted piece 18 will be described later, a pitch line passing the center of the respective pieces 26 and 18 and extending radially around the rotation axis 12 is used as a reference.

Figure 3:
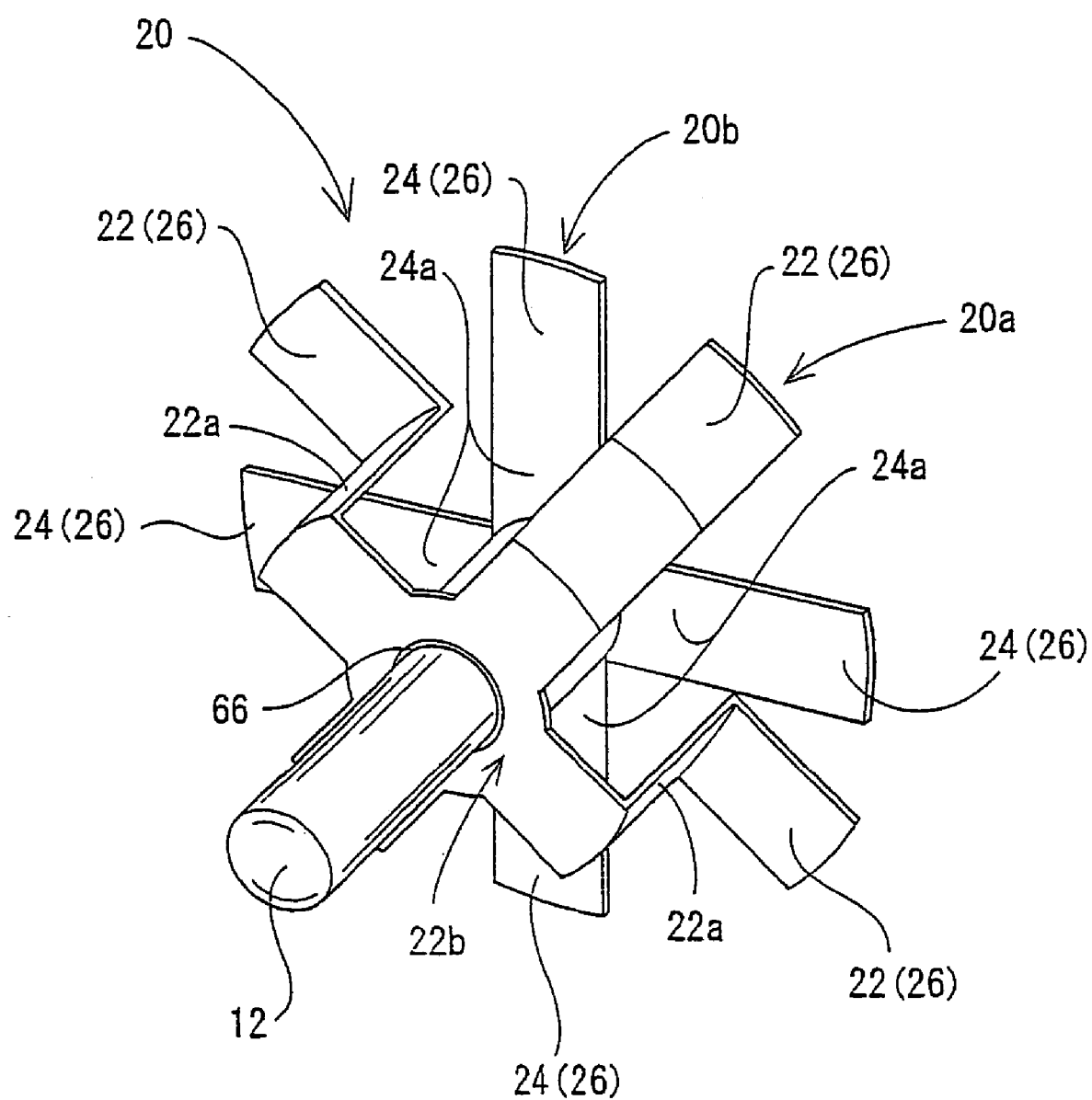
FIG. 3 is a perspective view of a first yoke and a second yoke that constitute a yoke 20 according to the first embodiment of the present invention.

Next, the yoke 20 will be described with reference to FIG. 3. FIG. 3 is a perspective view of a first yoke 20a and a second yoke 20b that constitute the yoke 20. In the first yoke 20a, four long plates 22a are joined to a peripheral portion 22b around the rotation axis 12, and an end of each long plate 22a is bent into an L shape to form a first iron piece 22. The first iron pieces 22 are close to and parallel to the front surface of the permanent magnet 14. The distance between the permanent magnet 14 and the first iron pieces 22 is about 2 millimeters. The four long plates 22a are developed radially around the rotation axis 12 at a pitch angle of 90 degrees and cover the coil 30 from the outside. Therefore, the first iron pieces 22 are placed at a pitch angle of 90 degrees around the rotation axis 12.

In the second yoke 20b, four short plates 24a are combined together in a hollow portion of the bobbin 31 (a portion through which the rotation axis 12 passes) and an end of each short plate 24a is bent into an L shape to form a second iron piece 24. The second iron pieces 24 are close to and parallel to the front surface of the permanent magnet 14. The four short plates 24a are developed radially around the rotation axis 12 at a pitch angle of 90 degrees. In other words, the second iron pieces 24 are placed at a pitch angle of 90 degrees around the rotation axis 12.

The first iron pieces 22 and the second iron pieces 24 are joined together and placed at 45 degrees apart from each other around the rotation axis 12. Further, the first iron pieces 22 and the second iron pieces 24 are rotatably mounted on the rotation axis 12 through a bearing 66. In this embodiment, the first iron pieces 22 and the second iron pieces 24 are rectangular in shape. However, in order that larger areas of the first iron pieces 22 and the second iron pieces 24 can be close to the permanent magnet 14, they may be substantially fan-shaped. The first iron pieces 22 and the second iron pieces 24 are hereinafter referred to as "field iron piece 26", unless specified otherwise. In this embodiment, the field iron piece 26 is formed of silicon steel plate.

Next, the coil 30 will be described with reference to FIG. 1. The coil 30 is formed by winding a copper wire on a ring-shaped bobbin 31 that is electrically insulated since it is made of synthetic resin. The first yoke 20a and the second yoke 20b are fixed to the coil 30 through the bearing 66 to form a stator. The stator is mounted on the rotation axis 12 in such a manner that the rotation axis 12 can be freely rotated.

Next, the attracted means 19 will be described with reference to FIG. 2. The attracted means 19 is composed of a fixed base 36 and eight attracted pieces 18. As shown in FIG. 2, on the back side of the permanent magnet 14, a disk-shaped fixed base 36 having a proper thickness is supported by the rotation axis 12 that passes through the center of the base 36. Since this fixed base 36 is formed of non-magnetic material, it is not magnetized by the permanent magnet 14. In this embodiment, the fixed base is formed of synthetic resin.

On the permanent magnet's side of the fixed base 36, eight rectangular attracted pieces 18 formed of the same material as the field iron pieces 26 are provided. The attracted pieces 18 are fixed to the positions on the base 36 that correspond to the positions that bisect the spaces between the field iron pieces 26 and are arranged radially around the rotation axis 12. The fixed base 36 is fixed to the rotation axis 12 through the bearing 66. Therefore, the base 36 is freely rotatable around the rotation axis 12.

The distance between the permanent magnet 14 and the attracted pieces 18 is the same as that between the field iron pieces 26 and the permanent magnet 14. For example, it is about 2 millimeters in this embodiment. Further, the area of the attracted piece 18 is the same as that of the field iron piece 26. Further, it is preferable that the shape and the area of the attracted piece 18 is the same as those of the field iron piece 26.

Next, a positional relationship between the field iron pieces 26 and the attracted pieces 18 will be described with reference to FIG. 2. The eight field iron pieces 26 are spaced equally at an angle pitch of 45 degrees around the rotation axis 12. Also, the eight attracted pieces 18 are spaced equally at an angle pitch of 45 degrees around the circumference that is divided into eight about the rotation axis 12. The eight field iron pieces 26 and the eight attracted pieces 18 are staggered at an angle of 22.5 degrees that is half of 45 degrees.

The stator in which the yoke 20 and the coil 30 are integrally formed and the fixed base 36 having the attracted pieces thereon are fixed to a case (not shown) that covers the electric generator 10. Therefore, the positions of the field iron pieces 26 and the attracted pieces 18 are placed at a fixed position in such a manner they are staggered at 22.5 degrees.

A function of this embodiment will be described below. In this electric generator 10, magnetic flux applied to the field iron pieces 26 by the permanent magnet 14 crosses the coil 30 in the axial direction and thereby the coil 30 produces an electromagnetic force. When the permanent magnet 1 rotates with the rotation axis 12, the magnetic poles applied to the field iron pieces 26 are reversed alternately. By alternately reversing the direction of the magnetic flux crossing the coil 30 in the axial direction, the coil 30 produces the electromagnetic force continuously.

FIGS. 4(a) to 4(d) are a schematic cross sectional view of the electric generator 10 of the first embodiment. The permanent magnet 14 rotates with the field iron pieces 26 and the attracted pieces 18 fixed. The permanent magnet 14 rotates in the direction of an arrow R shown in FIG. 1. In FIGS. 4(a) to 4(d), the rotation of the permanent magnet 14 is shown by a down to up movement.

FIG. 4(a) shows that the permanent magnet 14 exerts a strong attractive force on the field iron pieces 26. FIG. 4(b) shows the state after the permanent magnet 14 rotated 11.25 degrees (half of the 22.5 degrees) about the rotation axis 12 from the state shown in FIG. 4(a). FIG. 4(c) shows that the state after the permanent magnet 14 rotated 11.25 degrees about the rotation axis 12 from the state shown in FIG. 4(b). FIG. 4(d) shows that the state after the permanent magnet 14 rotated 11.25 degrees about the rotation axis 12 from the state shown in FIG. 4(c). A positional relationship between the permanent magnet 14 shadowed in FIG. 4(a) to 4(d) and the field iron pieces 16 or the attracted pieces 18 will be described below.

In FIG. 4(a), when a span between the field iron pieces 26 is d, a span between the field iron piece 26 and the attracted piece 18 is d/2. When the permanent magnet 14 is in a position shown in FIG. 4(a), a distance between the permanent magnet 14 and the attracted pieces 18 is u and a distance between the permanent magnet 14 and the field iron pieces 26 is t. When the permanent magnet 14 is in a position shown in FIG. 4(b), a distance between the permanent magnet 14 and the field iron pieces 26 and a distance between the permanent magnet 14 and the attracted pieces 18 are r. Among the distances t, u, and r, the distance t is the shortest and the distance u is the longest.

In the state shown in FIG. 4(a), since there is a distance of t between the field iron pieces 26 and the north pole of the permanent magnet 14, the south pole that is an opposite magnetic pole appears remarkably in the field iron piece 26. Further, since there is a distance of u between the south pole of the permanent magnet 14 and the attracted pieces 18, the north pole that is an opposite magnetic pole appears weakly in the attracted pieces 18 placed on the both sides of the permanent magnet 14.

Figure 4:
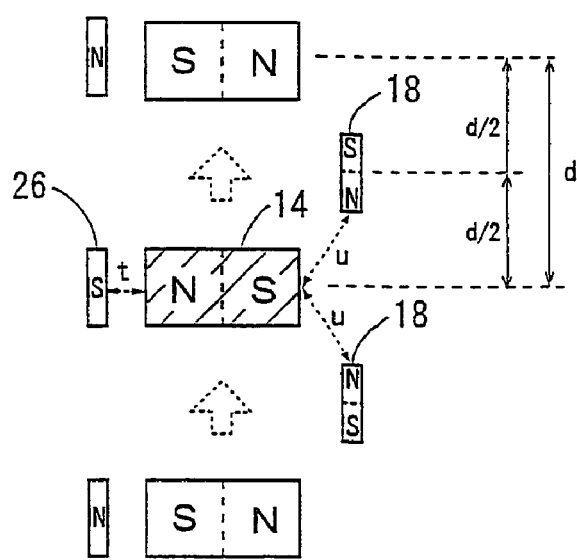
Figure 4:
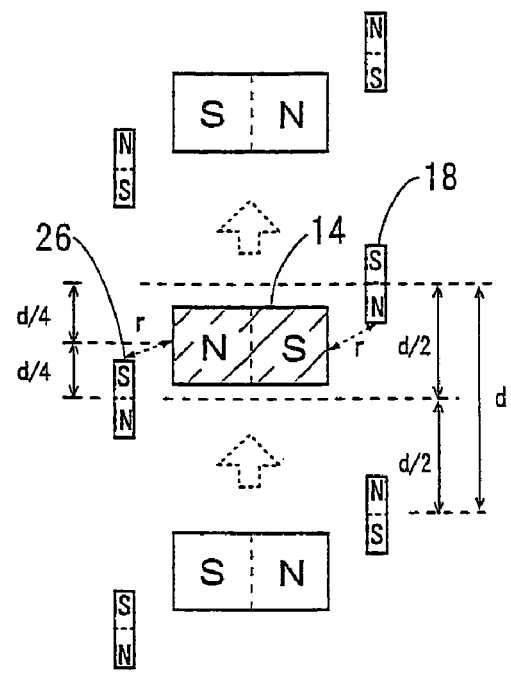
Figure 4:
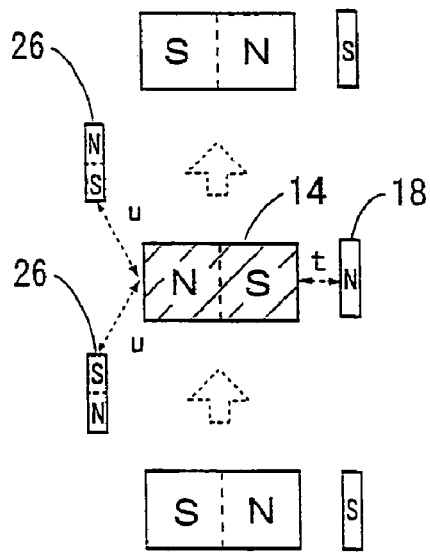
Figure 4:
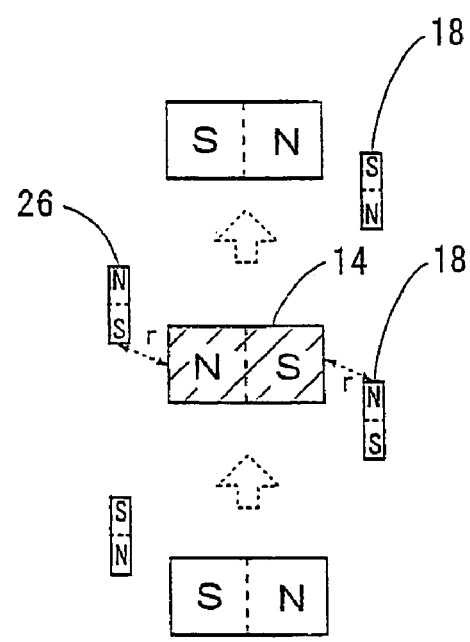

In the state shown in FIG. 4(*b*), since there is a distance of r between the field iron pieces 26 and the north pole of the permanent magnet 14, the south pole that is an opposite magnetic pole appears weakly in one of the field iron pieces 26. Further, since there is a distance of r between the attracted piece 18 and the south pole of the permanent magnet 14, the north pole that is an opposite magnetic pole appears weakly in one of the attracted pieces 18. In this state, the attractive force that the permanent magnet 14 exerts on the field iron pieces 26 is balanced with the attractive force that the permanent magnet 14 exerts on the attracted pieces 18.

In the state shown in FIG. 4(*c*), since there is a distance of u between the permanent magnet 14 and the field iron pieces 26, the south pole that is an opposite magnetic pole appears weakly in the field iron pieces 26 placed on the both sides of the north pole of the permanent magnet 14. Further, since there is a distance of t between the attracted pieces 18 and the south pole of the permanent magnet 14, the north pole that is an opposite magnetic pole appears remarkably in the field iron piece 26.

In the state shown in FIG. 4(*d*), since there is a distance of r between the field iron pieces 26 and the north pole of the permanent magnet 14, the south pole that is an opposite magnetic pole appears weakly in one of the field iron piece 26. Further, since there is a distance of r between the attracted pieces 18 and the south pole of the permanent magnet 14, the north pole that is an opposite magnetic pole appears weakly in one of the attracted pieces 18. In this state, the attractive force that the permanent magnet 14 exerts on the field iron pieces 26 is balanced with the attractive force that the permanent magnet 14 exerts on the attracted pieces 18.

Next, an attractive force exerted on the rotation axis 12 during the transition from the state shown in FIG. 4(*a*) to that shown in FIG. 4(*b*) will be described below. When the rotation axis 12 rotates even slightly from the position where the permanent magnet 14 exerts a strong attractive force on the field iron pieces 26, the attractive force that the permanent magnet 14 exerts on the field iron pieces 26 decreases while the attractive force that the permanent magnet 14 exerts on the attracted pieces 18 increases. In this case, when the permanent magnet 14 rotates slightly from the position where the permanent magnet 14 exerts the strongest attractive force on the field iron pieces 26, forces are exerted in a direction that the north pole generated on the attracted pieces 18 attracts the south pole of the permanent magnet 14. This cancels the attractive force that the north pole of the permanent magnet 14 exerts on the field iron pieces 26 to some extent and therefore the attractive force exerted on the rotation axis 12, namely cogging torque, decreases. In other words, although the maximum value of the cogging torque exerted on the rotation axis 12 does not decrease, the attractive force exerted on the field iron pieces 26 by the permanent magnet 14, which hinders the rotation of the rotation axis 12, can be decreased by exerting the attractive force in a direction that the field iron pieces 26 attract the permanent magnet 14. Therefore, the time that the field iron pieces 26 strongly attract the permanent magnet 14 can be shortened.

Next, an attractive force exerted on the rotation axis 12 during the transition from the state shown in FIG. 4(*b*) to that shown in FIG. 4(*c*) will be described below. When the rotation axis 12 rotates even slightly from the position where the permanent magnet 14 is between the field iron piece 16 and the attracted piece 18, the distance between the permanent magnet 14 and the attracted pieces 18 becomes shorter so that the attractive force exerted in the direction that the permanent magnet 14 attracts the attracted portion 18 increases. As this result, the distance between the permanent magnet 14 and the field iron pieces 26 becomes longer and the attractive force exerted in the direction that the permanent magnet 14 attracts the field iron pieces 26 becomes weaker.

Next, an attractive force exerted on the rotation axis 12 during the transition from the state shown in FIG. 4(*c*) to that shown in FIG. 4(*d*) will be described below. When the rotation axis 12 rotates even slightly from the position where the permanent magnet 14 exerts a strong attractive force on the attracted pieces 18, the attractive force that the permanent magnet 14 exerts on the field iron pieces 26 increases while the attractive force, which the permanent magnet 14 exerts on the attracted pieces 18, decreases. In this case, when the permanent magnet 14 rotates slightly from the position where the permanent magnet 14 exerts the strongest attractive force on the attracted pieces 18, forces are exerted in a direction that the south pole generated on the field iron piece 26 attracts the north pole of the permanent magnet 14. This cancels the attractive force that the south pole of the permanent magnet 14 exerts on the attracted pieces 18 to some extent and therefore the attractive force exerted on the rotation axis 12, namely cogging torque, decreases.

Next, an attractive force exerted on the rotation axis 12 during the transition from the state shown in FIG. 4(*d*) to that shown in FIG. 4(*a*) will be described below. When the rotation axis 12 rotates even slightly from the position where the permanent magnet 14 is between the field iron piece 16 and the attracted piece 18, the distance between the permanent magnet 14 and the field iron piece 26 becomes shorter so that the attractive force exerted in the direction that the permanent magnet 14 attracts the field iron piece 26 increases. As this result, the distance between the permanent magnet 14 and the attracted pieces becomes longer and the attractive force exerted in the direction that the permanent magnet 14 attracts the attracted pieces 18 becomes weaker.

Compared to the case where there are no attracted pieces 18, cogging torque is generated in more positions in the case where there are the attracted pieces 18. However, the maximum value of the cogging torque in the direction where the rotation of the rotation axis 12 is hindered does not change, but the positions where the cogging torque is generated becomes double. In other words, compared to the case where there are no attracted pieces 18, a cycle of the cogging torque is halved.

During the transition from the state shown in FIG. 4(*a*) to that shown in FIG. 4(*b*), the attracted pieces 18 placed between the field iron pieces 26 positively attract the permanent magnet 14 and thereby an attractive force between the permanent magnet 14 and the field iron pieces 26 is reduced. Alternatively, during the transition from the state shown in FIG. 4(*c*) to that shown in FIG. 4(*d*), the field iron pieces 26 placed in positions that correspond to positions between the attracted pieces 18 positively attract the permanent magnet 14 and thereby an attractive force between the permanent magnet 14 and the attracted pieces 18 is reduced.

Accordingly, the maximum value of the cogging torque exerted on the rotation axis 12 does not change, but the cogging torque is exerted on the rotation axis 12 only for a short time and the cycle of the cogging torque is halved. This allows a smooth rotation of the rotation axis 12.

In the first embodiment, the permanent magnet 14 having eight magnetic poles is used. However, a permanent magnet having more magnetic poles can be used within an acceptable range for design. The numbers of the field iron pieces 26 and the attracted pieces 18 are also increased so that they are as many as the magnetic poles of the permanent magnet 14.

Further, in the first embodiment, the attracted pieces 18 are provided on the back side of the permanent magnet 14. However, a different yoke for applying magnetic flux to a coil may be used instead of the attracted pieces 18.

Next, a second embodiment in which a different yoke for applying magnetic flux to a coil instead of the attracted pieces 18 will be described. In the second embodiment, a disk-like permanent magnet 14 is mounted on one rotation axis 12 and wire wound means 17a and 17b are provided on both sides of the disk-like permanent magnet 14 in such a manner that the wire wound means 17a and 17b are opposed to each other, as shown in FIG. 5. The wire wound means 17a is composed of the field iron pieces 26a and the coil 30a and the wire wound means 17b is composed of the field iron pieces 26b and the coil 30b. The wire wound means 17a and 17b are of the same structure. The field iron pieces 26b of the wire wound means 17b are placed in such positions that spaces between the field iron pieces 26a of the wire wound means 17a are divided into equal halves. The permanent magnet 14, the field iron pieces 26a and 26b, and the coil 30a and 30b are of the same structure as those described in the first embodiment.

Specifically, as shown in FIG. 5, the field iron pieces 26a of the wire wound means 17a are staggered at 22.5 degrees apart from the field iron pieces 26b of the wire wound means 17b. This is the same positional relationship as that between the field iron pieces 26 and the attracted pieces 18 of the electric generator 10 according to the first embodiment.

Thus, in the same manner as the first embodiment, the cycle of the cogging torque is halved. When the rotation axis 12 rotates even slightly from the position where the maximum cogging torque is exerted, the field iron pieces 26 attract the permanent magnet 14. This induces the rotation of the rotation axis 12 and allows a smooth rotation of the rotation axis 12.

Next, there will be described a synthesized voltage of the coil 30a and 30b where the field iron pieces 26a and 26b are staggered at 22.5 degrees from each other. When the coil 30a and the coil 30b are connected in series, sine waves whose phases are shifted are synthesized and thus a synthesized voltage is produced. In the second embodiment, the permanent magnet has eight magnetic poles. When the permanent magnet 14 makes a turn, four cycles of voltage are output to the coils 30a and 30b. However, a voltage output from the coil 30a is an electric angle of 90 degrees out of phase with a voltage output from the coil 30b. Accordingly, the maximum value of the synthesized voltage is the square root of 2 times the voltage generated by the coil 30. In the second embodiment, the field iron pieces 26b are placed in such positions that the field iron pieces 26a are divided into two halves. This is under the same technical concept as the placement of the field iron pieces 26a and 26b staggered at an electrical angle of 90 degrees from each other, in the case of eight magnetic poles. Specifically, in the case of eight magnetic poles, "to be staggered at a mechanical angle of 22.5 degrees" is the same meaning as "to be staggered at an electric angle of 90 degrees".

In the second embodiment, two wire wound means 17a and 17b share the permanent magnet 14. This allows a smooth rotation of the rotation axis 12 without increasing the maximum value of the cogging torque. In this case, when the two wire wound means 17a and 17b are connected in series, the voltage value also becomes the square root of 2 times the maximum voltage of a single wire wound means. In other words, compared to the case where a single wire wound means is used, the rotation axis 12 is turned by the same force but the maximum voltage can be increased the square root of 2 times. In this case, the moment of inertia applied to the rotation axis 12 is not considered.

Further, in the second embodiment, the disk-like permanent magnet 14 is mounted on the single rotation axis 12 and the wire wound means 17a and 17b are provided on the both sides of the permanent magnet 14, but the numbers of wire wound means 17 and the permanent magnet 14 are not limited thereto. The scope of the present invention covers an electric generator in which a plurality of permanent magnets 14 are mounted on a single rotation axis 12 and two wire wound means 17 are provided to the both sides of each permanent magnet 14.

Where a plurality of wire wound means 17 are provided, it is desirable that the field iron pieces are so placed that the phase of the synthesized voltage of the plurality of wire wound means 17 connected in series is 90 degrees out of phase with the voltage of a single wire wound means. In other words, in the case where four wire wound means 14 are mounted on a single rotation axis 12, it is desirable that the field iron pieces 26 of the respective wire wound means 17 are spaced equally and staggered at 15 degrees apart from each other. In this case, it is premised that the two permanent magnets 14 have magnetic poles on the same positions.

A third embodiment of the present invention will be described with reference to FIG. 6. FIG. 6 is a schematic sectional view of an electric generator 10 according to a third embodiment of the present invention. In the third embodiment, there will be described an electric generator 10 in which two sets of electromotive means 16 (a combination of coils 30, field iron pieces 26, permanent magnets 14, attracted pieces 18, and fixed bases 36) are mounted on the rotation axis 12 and in which the rotation axis 12 is smoothly rotated. In FIG. 6, on the left side is electromotive means 16a and on the right side is electromotive means 16b.

When the two sets of electromotive means 16a and 16b are mounted on the rotation axis 12, if the field iron pieces 26 and the permanent magnets 14 of the electromotive means 16a and 16b are placed symmetrically with respect to the rotation axis 12, the maximum value of the cogging torque becomes double. This value is calculated without consideration of frictional resistance and the like.

In the third embodiment, when the two sets of electromotive means 16a and 16b are mounted on the rotation axis 12, the permanent magnets 14 in the electromotive means 16a are placed in such positions that the cogging torque becomes minimum while the permanent magnets 14 in the electromotive means 16b are placed in such positions that the cogging torque becomes maximum.

In the left electromotive means 16a shown in FIG. 6, the permanent magnet 14 is at the midpoint (d/4) of the span d/2 between the field iron piece 26 and the attracted piece 18. This position is a position where the cogging torque becomes minimum in the electromotive means 16a. On the other hand, in the right electromotive means 16b shown in FIG. 6, the permanent magnet 14 is placed in a position closest to the field iron piece 26. This position is a position where the cogging torque becomes maximum in the electromotive means 16b.

Specifically, in the two sets of electromotive means 16a and 16b, the field iron pieces 26 and the attracted pieces 18 are placed symmetrically with respect to the fixed bases 36. In the one set of electromotive means, the respective permanent magnets 14 are placed in such positions that the minimum cogging torque is generated, and in the other set of electromotive means, the respective permanent magnets 14 are placed in such positions that the maximum cogging torque is generated. Thus the electromotive means are mounted on the rotation axis 12 in such a manner that the permanent magnets 14 in both electromotive means are staggered.

In the third embodiment, the maximum cogging torque is generated at different positions in the two electromotive means 16a and 16b. Therefore, compared to the case where the two sets of electromotive means 16a and 16b are placed symmetrically (the field magnetic pieces 26, attracted pieces 18, and the permanent magnets 14 are placed symmetrically with respect to the fixed stage 36), the maximum value of the cogging torque that is generated when the two sets of electromotive means 16 are turned at the same time can be reduced. Further, compared to the case where the two sets of electromotive means 16a and 16b are placed symmetrically, the cycle of the maximum cogging torque that is generated when the rotation axis is turned is halved.

Further, in the third embodiment, the electromotive means 16a and 16b are mounted on the rotation axis 12 in such a manner that the permanent magnets 14 are placed in such positions that the cogging torque is maximum in the electromotive means 16a while the permanent magnets 14 are placed in such positions that the cogging torque is minimum in the electromotive means 16b. This is the same relationship as that between the field iron pieces 26 and the attracted pieces 18 in the first embodiment. Specifically, when the electromagnetic means 16a rotates even slightly from the position where the maximum cogging torque is generated, the other electromagnetic means 16b generates the attractive force, which decreases the attractive force exerted on the rotation axis 12 by the electromotive means 16a. Accordingly, the cogging torque is exerted on the rotation axis 12 only for a short time and the cycle of the cogging torque is halved. This allows a smooth rotation of the rotation axis 12.

While it has been described in the third embodiment that the two sets of electromotive means 16 are mounted on the same rotation axis 12, the number of electromotive means 16 are not limited to two sets. In the case where three or more sets of the electromotive means 16 are mounted on the rotation axis 12, it is sufficient to mount them in such a manner that the position where the maximum cogging torque is generated varies depending on the respective electromotive means. As a method of mounting the electromotive means in such a manner that the position where the maximum cogging torque is generated varies depending on the respective electromotive means, there may be employed a method of staggering the permanent magnets 14 or a method of staggering the field iron pieces 26, as described in the third embodiment.

Further, if a plurality of the electromotive means 16 are provided in the third embodiment, it is desirable that the electromotive means 16 are so positioned that the phase of the synthesized voltage of the electromotive means 16 connected in series is electric angle of 45 degrees out of phase with that of the voltage of a single electromotive means 16.

A fourth embodiment of the present invention will be described with reference to FIG. 7. FIG. 7 is a perspective view of an electric generator 10 according to the fourth embodiment of the present invention. In the fourth embodiment, there will be described an electric generator 10 in which two sets of electric generating means 28a and 28b (a combination of permanent magnet, coil, and yoke) are mounted on the rotation axis 12 and in which the rotation axis 12 is smoothly rotated.

This electric generator 10 comprises a rotation axis 12 to which torque is transmitted by a force from outside, a first permanent magnet 40 and a second permanent magnet 42 that are field magnet means mounted on the rotation axis 12, a first yoke 46 composed of eight iron pieces to which magnetic flux is applied by the first permanent magnet 40, a first coil 32 to which magnetic flux is applied by the first yoke, a second yoke 46 composed of eight iron pieces to which magnetic flux is applied by the second permanent magnet 42, and a second coil 34 to which magnetic flux is applied by the second yoke 46.

The first permanent magnet 40 and the second permanent magnet 42 have a cylindrical shape, and the first permanent magnet 40 and the second permanent magnet 42 are mounted on the rotation axis 12. On the first permanent magnet 40 and the second permanent magnet 42, eight poles composed of north poles and south poles are staggered along the outer periphery, respectively. In other words, magnetic poles that pair up with the magnetic poles staggered along the outer periphery are provided on the inside surface of the rotation axis 12. Further, on the first permanent magnet 40 and the second permanent magnet 42, magnetic poles are so arranged that different magnetic poles are opposed to each other. However, the first permanent magnet 40 and the second permanent magnet 42 are separated from each other by a non-magnetic panel (not shown) so that they are not influenced from each other.

The first yoke 44 to which magnetic flux is applied by the first permanent 40 is composed of four plate-like first long iron pieces 48 and four plate-like short iron pieces 50. The length of the first long iron-piece 48 is substantially equal to the axial length of the first coil 32 and the axial length of the first permanent magnet 40. The length of the first short iron piece 50 is substantially equal to the axial length of the first permanent magnet 40.

The four long iron pieces 48 are like a long plate. One end of each long iron piece 48 is extended. The extended ends of the respective first long iron pieces 48 are joined together around the rotation axis 12. The first long iron pieces 48 are in close vicinity to the outer surface of the first coil 32 and the outer surface of the first permanent magnet 40. These four iron pieces are spaced at 90 degrees apart from each other. Likewise, one end of each first short iron piece 50 is extended. The extended ends of the respective first short iron pieces 50 are joined together around the rotation axis 12.

These first short iron pieces 50 are in close vicinity to the outer surface of the first permanent magnet 40 and the one end of each iron piece 50 is in contact with the inside surface of the first coil 32. These four iron pieces are spaced at 90 degrees apart from each other around the rotation axis 12. These first long iron pieces 48 and first short iron pieces 50 are mounted rotatably on the rotation axis 12.

The first long iron pieces 48 and the first short iron pieces 50 are staggered and arranged radially around the rotation axis 12. Therefore, the first long iron pieces 48 and the first short iron pieces 50 are placed at 45 degrees apart from each other around the rotation axis 12.

As in the case of the first yoke 44, the second yoke 46 to which magnetic flux is applied by the second permanent magnet 42 is composed of four plate-like second long iron pieces 52 and four plate-like second short iron pieces 54.

The second long iron pieces 52 and the second short iron pieces 54 are of the same structure as those of the first yoke 44.

Next, the positional relationship between the first yoke 44 and the second yoke 46 will be described. The first long iron pieces 48 and the first short iron pieces 50 of the first yoke and the second long iron pieces 52 and the second short iron pieces 54 of the second yoke 46 are staggered around the rotation axis 12. For example, the first long iron pieces 48 of the first yoke 44 are placed at 22.5 degrees apart from the second long iron pieces 52 of the second yoke 46 around the rotation axis 12. This positional relationship is the same as the positional relationship between the field iron pieces 26 and the attracted pieces 18.

FIGS. 8(a) and 8(b) schematically show how the respective iron pieces of the first yoke 44 and the second yoke 46 are positioned around the rotation axis 12. In FIG. 8(a), pitch lines are shown around the rotation axis 12. Solid lines are pitch lines of the iron pieces constituting the first yoke 44, and doted lines are pitch lines of the iron pieces constituting the second yoke 46. FIG. 8(b) shows schematically a cross section of the electric generator 10 of the fourth embodiment. The iron pieces of the first yoke 44 are placed at 45 degrees apart from each other around the rotation axis 12. Further, the iron pieces of the first yoke 44 are placed at 22.5 degrees apart from the iron pieces of the second yoke 46.

A function of the fourth embodiment will be described. As shown in FIG. 8(b), when the first long iron pieces 48 of the first yoke 44 become south pole, the first short iron pieces 50 become north pole. In other words, magnetic lines of force flow from the first short iron pieces 50 to first long iron pieces 48 to generate a magnetic field crossing the first coil 32 in the direction of the rotation axis 12.

FIGS. 9(a) to 9(c) are sectional views taken on line A-A of the electric generator 28a and sectional views taken on line B-B of the electric generator 28b. FIGS. 9(a) to 9(c) schematically show a positional relationship between the permanent magnet 14, the first yoke 44, and the second yoke 46 when the rotation axis 12 is turned in the direction of an arrow R shown in FIG. 7. FIGS. 9(a) to 9(c) show a change in positional relationship between the permanent magnet 14, the first yoke 44, and the second yoke 46 during the rotation of the rotation axis 12. In the drawings, an upper view is a sectional view taken on line A-A and a lower view is a sectional view taken on line B-B.

In the upper sectional view taken on line A-A in FIG. 9(a), the ion pieces (first long iron piece 48 and first short iron piece 50) constituting the first yoke 44 are placed in positions where the magnetic flux density of the first permanent magnet 40 is maximum (in front of the centers of the north pole and the south pole). At these positions, a strong attractive force is exerted on the iron pieces constituting the first yoke 44 and therefore strong cogging torque is generated on the rotation axis 12 on which the first permanent magnet 40 is mounted.

On the other hand, the iron pieces (second long iron pieces 52 and second short iron pieces) constituting the second yoke 46 are placed in front of the borders between the magnetic poles of the second magnetic pole 42 (borders between the north poles and the south poles), as shown in the lower sectional view taken on line B-B in FIG. 9(a). At these places, only a weak attractive force is exerted on the iron pieces of the second yoke 46 and therefore weak cogging torque is generated on the rotation axis 12 on which the second permanent magnet 42 is mounted.

When first permanent magnet 40 and the second permanent magnet 42 mounted on the rotation axis 12 rotates about the rotation axis 12 (rotation from the position shown in FIG. 9(a) to the position shown in FIG. 9(b)), the cogging torque exerted on the rotation axis 12 by the first permanent magnet 40 gradually becomes weak while the cogging torque exerted on the rotation axis 12 by the second permanent magnet 42 gradually becomes strong. Such states last until the respective permanent magnets move to the positions shown in FIG. 9(b).

As shown in the lower sectional view in FIG. 9(b) taken on line B-B, the iron pieces constituting the second yoke 46 are placed in the positions where the magnetic flux density of the second permanent magnet 42 is maximum. At these positions, a strong attractive force is exerted on the iron pieces constituting the second yoke 46 and therefore strong cogging torque is generated on the rotation axis 12 on which the second permanent magnet 42 is mounted. On the other hand, the iron pieces constituting the first yoke 44 are placed in front of the borders between the magnetic poles of the first permanent magnet 40. At these positions, only a weak attractive force is exerted on the iron pieces of the first yoke 44 and therefore weak cogging torque is generated on the rotation axis 12 on which the first permanent magnet 40 is mounted.

The strength of the cogging torque is determined by the attractive force of the permanent magnet for the iron pieces. In other words, strong attractive force for the iron pieces means strong cogging torque, while weak attractive force for the iron pieces means weak cogging torque.

The attractive force exerted on the first permanent magnet 40 is weakened by the attractive force exerted on the second permanent magnet 42 mounted on the rotation axis 12. Accordingly, the maximum value of the cogging torque exerted on the rotation axis 12 becomes smaller than the case where two electric generators are placed symmetrically.

When the first permanent magnet 40 and the second permanent magnet 42 mounted on the rotation axis 12 further rotate (rotation from the position shown in FIG. 9(b) to the position shown in FIG. 9(c)), the attractive force exerted on the second permanent magnet 42 gradually decreases while the attractive force exerted on the first permanent magnet 40 gradually increases. Such states last until the respective permanent magnets move to the positions shown in FIG. 9(c). In this case, the attractive force exerted on the second permanent magnet 42 is weakened by the attractive force exerted on the first permanent magnet 40 mounted on the rotation axis 12. Accordingly, the maximum value of the cogging torque exerted on the rotation axis 12 becomes smaller than the case where two electric generators are placed symmetrically.

In the fourth embodiment, the positions where the maximum cogging torque is generated are different depending on the electric generating means 28a and 28b. Therefore, the maximum value of the cogging torque that is generated when the two electric generating means 28 are simultaneously turned can be less than the case where the two electric generating means 28a and 28b are placed symmetrically. Further, when the rotation axis 12 is turned, the cycle of the maximum cogging torque is half as long as the case where the generating means 28a and 28b are placed symmetrically.

Furthermore, in the fourth embodiment, the first yoke 44 is so positioned that the cogging torque of the electric generating means 28a becomes maximum, while the second yoke 46 is so positioned that the cogging torque of the electric generating means 28b becomes minimum. Thus, the first yoke 44 and the second yoke 26 are mounted on the rotation axis 12. The relationship between the first yoke and the second yoke is the same as that between the field iron pieces 26 and the attracted pieces 18 described in the first embodiment. Specifically, when the rotation axis rotates even slightly from the position where the cogging torque of the electric generating means 28a becomes maximum, the electric generating means 28b generates the attractive force. This decreases the attractive force exerted on the rotation axis 12 by the electric generating means 28a. Accordingly, the cogging torque is exerted on the rotation axis 12 only for a short time and the cycle of the cogging torque is halved. This allows a smooth rotation of the rotation axis 12.

While it has been described in the fourth embodiment that the two sets of electric generating means 28 are mounted on the same rotation axis 12, the number of electric generating means 28 are not limited to two sets. Where three or more sets of the electric generating means 28 are mounted on the rotation axis 12, it is sufficient to mount them in such a manner that the position where the maximum cogging torque is generated varies depending on the respective electric generating means. As a method of coupling the electric generating means in such a manner that the position where the maximum cogging torque is generated varies depending on the respective electric generating means, there may be employed a method of staggering the yokes or a method of staggering the permanent magnets, as described in the fourth embodiment.

Further, if a plurality of the electric generating means 28 are provided in the fourth embodiment, it is desirable that the electric generating means 28 are so positioned that the phase of the synthesized voltage of the electric generating means 28 connected in series is electric angle of 45 degrees out of phase with that of the voltage of a single electric generating means.

FIG. 10 shows a fifth embodiment of the electric generator 10 according to the present invention. FIG. 11 is a sectional view of the electric generator 10 according to the fifth embodiment. The electric generator 10 according to the fifth embodiment comprises: a first coil 56 and a second coil 58 mounted on the rotation axis 12; a first yoke 66 and a second yoke 68 composed of a plurality of iron pieces provided to the outer peripheries of the first coil 56 and the second coil 58, and permanent magnets 64 surrounding the first yoke 66 and the second yoke 68. A combination of the first coil 56 and the first yoke 66 and a combination of the second coil 58 and the second yoke 68 are mounted on the rotation axis 12.

The first coil 56 and the second coil 58 mounted on the rotation axis 12 are formed by winding copper wire around a cylindrical bobbin (not shown) made of synthetic resin. The first coil 56 and the second coil 58 are mounted on the rotation axis 12 that goes through the middle of the bobbin. Therefore, by turning the rotation axis 12, the first coil 56 and the second coil 58 are turned.

The first yoke 66 provided to the outer periphery of the first coil 56 is composed of fourteen first iron pieces 60 which are spaced equally and radially about the rotation axis 12 and fourteen second iron pieces 62 which are spaced equally and radially about the rotation axis 12. These twenty-eight iron pieces are about as long as the axial thickness of the first coil 56. The fourteen first iron pieces 60 are so arranged that they surround the first coil 56 and are mounted on the rotation axis 12.

Further, the fourteen second iron pieces 62 are arranged alternately with the fourteen first iron pieces 60 so that they surround the first coil 56 and are mounted on the rotation axis 12. In other words, the first coil 56 is surrounded by the first iron pieces 60 and the second iron pieces 62.

As in the case of the first coil 56, the second coil 58 is also surrounded by twenty-eight iron pieces 60 and 62. The fourteen first iron pieces 60 are spaced at a pitch angle (between the centers of the surface areas of the iron pieces on the permanent magnet 14's side) of about 25.7 degrees (about one fourteenth of the circumference whose center is the rotation axis 12).

The fourteen first iron pieces 60 are arranged alternately with the fourteen second iron pieces 62. Specifically, the fourteen first iron pieces 60 and the fourteen iron pieces 62 are spaced at a pitch of about 12.9 degrees (one twenty-eighth of the circumference). Likewise, the twenty-eight iron pieces that surround the second coil 58 are spaced at a pitch of about 12.9 degrees.

Next, there will be described a positional relationship between the first yoke 66 that surrounds the first coil 60 and the second yoke 68 that surrounds the second coil 58. The twenty-eight iron pieces that surround the first coil 56 are spaced at a pitch of about 12.9 degrees around the rotation axis 12. The twenty-eight iron pieces that surround the second coil 58 are so arranged that their centers come between the iron pieces that surround the first coil 56.

Specifically, the second yoke 68 is shifted at about 6.4 degrees (one fifty-sixth of the circumference whose center is the rotation axis 12) from the first yoke 66. In other words, the iron pieces that surround the first coil 56 and the iron pieces that surround the second coil 58 are so arranged around the rotation axis 12 that they are shifted at an angle of about 6.4 degrees from each other.

The first iron pieces 60 and the second iron pieces 62 are provided closely to the inside perimeter of the ring-shaped permanent magnet 64. This permanent magnet 64 has a total of twenty-eight magnetic poles. Fourteen north poles and fourteen south poles are arranged alternately. The magnetic poles of this permanent magnet 64 are arranged in parallel with the axial direction of the rotation axis 12.

As shown in FIG. 10, this permanent magnet 64 is composed of four permanent magnets shaped like an arc of a quarter circle in combination and covers the first iron pieces 60 of the first coil and the second iron pieces 62 of the second coil 58.

The permanent magnet 64 that covers the first coil 56 and the second coil 58 applies magnetic fields to the first iron pieces 60 and the second iron pieces 62. When the rotation axis 12 is turned, the alternately arranged magnetic poles of the permanent magnet 64 apply alternately different magnetic fields to the first iron pieces 60 and the second iron pieces 62, and thereby the directions of magnetic fluxes that cross the first coil 56 and the second coil 58 are alternately changed. This causes the first coil 56 and the second coil 58 to successively produce electromotive force. During one turn of the rotation axis 12, the directions of the magnetic fluxes crossing the first coil 56 and the second coil 58 is changed 28 times.

Further, the permanent magnet 64 is fixed to the rotation axis 12 through a case (not shown) that covers the permanent magnet 64 and a bearing (not shown). In this case, the permanent magnet serves as a stator, and a combination of the first coil 56 and the first yoke 66 and a combination of the second coil 58 and the second yoke 68 are served as a rotator.

A function of the fifth embodiment will be described. In the fifth embodiment, the iron pieces of the respective coils around the rotation axis 12 do not correspond to each other. Therefore, the maximum cogging torques, which are generated, when the respective iron pieces are magnetized by the permanent magnet 64 are generated on different position.

Therefore, compared to the case where the positions of the iron pieces of the first yoke 66 that covers the first coil 56 correspond to those of the iron pieces of the second yoke 68 that covers the second coil 58, the maximum value of the cogging torque is reduced in the case of the electric generator 10 according to the fifth embodiment. In addition, since the cycle of the maximum cogging torque is halved, a smooth rotation of the rotation axis 12 can be realized.

In the fifth embodiment, the position where the maximum cogging torque is generated is changed by arranging the iron pieces that cover the first coil 56 and the iron pieces that cover the second coil 58 in a staggered configuration. However, instead of arranging the iron pieces in a staggered configuration, the magnetic poles of the permanent magnet 64 that provide magnetic flux to the iron pieces that cover the first coil 56 and the second coil 58 may be arranged in a staggered configuration. Further, the number of combinations of the coil and iron pieces that are mounted on the same rotation axis 12 are not limited to two. The number of combinations of the coil and the iron pieces that cover the coil can be increased within an acceptable range for design.

While five embodiments of the present invention have thus been described, it should be understood that the present invention be not limited to these embodiments. Various changes, modifications, and improvements can be made to the embodiments on the basis of knowledge of those skilled in the art without departing from the scope of the present invention.

INDUSTRIAL APPLICABILITY

As described above, in the present invention, the attracted pieces are provided to such positions that correspond to the positions between the field iron pieces that apply the magnetic field to the coil, so that the attractive force exerted to the attracted pieces by the permanent magnet can be used to stimulate the rotation of the rotation axis. Therefore, the resistance of the cogging torque to the rotation axis is reduced. Further, since the time that the rotation axis is affected by the cogging torque is shortened, abnormal vibration or noise of the electric generator is decreased. For this reason, when the electric generator of the present invention is used in the bicycle, wheels can be smoothly turned.

Further, since the cycle of the maximum cogging torque is shortened by providing the attracted pieces and variations of the cogging torque are reduced, the rotation axis can be smoothly rotated.

Furthermore, in the present invention, a plurality of wire wound means (a combination of the field iron pieces and the coil) can be provided. In this case, the field iron pieces and the attracted pieces are replaced with two wire wound means. For example, one permanent magnet is shared between two wire wound means. If the iron pieces of the one wire wound means and the iron pieces of the other wire wound means are staggered, the maximum vale of the cogging torque is not increased. Therefore, the rotation axis can be smoothly rotated. In this case, when the two wire wound means are connected in series, the maximum voltage is the square root of 2 times the maximum voltage of single wire wound means. In other words, although the rotation axis is rotated by the same power, the maximum voltage can be the square root of 2 times as that of the single wire wound means.

Furthermore, in the present invention, a plurality of electric generating means (combination of coil, yoke, and permanent magnet) in which the positions where the maximum cogging torque is generated are different are mounted on the rotation axis, so that the time that the rotation axis is affected by the cogging torque is shortened and therefore the rotation axis can be smoothly rotated. In addition, since the cycle of the maximum cogging torque is shortened, the rotation axis can be smoothly rotated.

When the electric generator of the present invention is used for a wind power generator, the effect of the cogging torque on the rotation axis is reduced, so that a rotator can be rotated by a slight breeze. In addition, since a rotator can be rotated by light wind, the electric generator of the present invention can be used effectively in a light wind area as a wind power generator.

What is claimed is:

1. An electric generator comprising a plurality of electric generating means each having a magnet composed of even-numbered magnetic poles arranged in the rotation direction of a rotation axis, a coil mounted on the rotation axis, and a yoke composed of iron pieces corresponding to the even-numbered magnetic poles of said magnet which are provided at the outer periphery of the coil and adjacent to the magnetic poles and which are arranged on the same axis as said rotation axis, said plurality of electric generating means being connected for common rotation about the rotation axis, the improvement wherein the respective magnetic poles and the yoke of one electric generating means and that of another, neighboring electric generating means are rotated relatively to balance a force to attract the magnetic poles and the iron pieces constituting the yoke of the one electric generating means with a force to attract the magnetic poles and the iron pieces constituting the yoke of the other, neighboring electric generating means;

wherein the iron pieces that constitute the yokes of said plurality of electric generating means comprise a plurality of first iron pieces which are arranged successively in one rotation direction about said rotation axis, and a plurality of second iron pieces, which are as many as the plurality of first iron pieces, which are arranged successively in an opposite direction to that of the first iron pieces, between the adjacent first iron pieces;

wherein the positions of the first and the second iron pieces of said plurality of electric generating means, placed adjacent to each other, are displaced with respect to each other in the rotation direction of said rotation axis, and wherein the magnetic poles that constitute the magnets of said plurality of electric generating means, placed adjacent to each other, are aligned in the rotation direction of said rotation axis; and wherein the one electric generating means and the other electric generating means are connected in series.

2. The electric generator according to claim 1, wherein a single common magnet is shared by said plurality of electric generating means.

* * * * *